(12) United States Patent
Detlefs et al.

(10) Patent No.: US 7,991,967 B2
(45) Date of Patent: Aug. 2, 2011

(54) USING TYPE STABILITY TO FACILITATE CONTENTION MANAGEMENT

(75) Inventors: David Detlefs, Westford, MA (US); Michael M. Magruder, Sammamish, WA (US); John Joseph Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/824,353

(22) Filed: Jun. 29, 2007

(65) Prior Publication Data
US 2009/0006405 A1 Jan. 1, 2009

(51) Int. Cl.
*G06F 12/00* (2006.01)
*G06F 13/00* (2006.01)
*G06F 13/28* (2006.01)
*G06F 7/00* (2006.01)
*G06F 17/30* (2006.01)

(52) U.S. Cl. ........ 711/150; 711/151; 711/152; 711/153; 711/170; 711/171; 711/172; 711/173; 707/756; 707/791

(58) Field of Classification Search .................. None
See application file for complete search history.

(56) References Cited

U.S. PATENT DOCUMENTS

| | | | |
|---|---|---|---|
| 5,241,675 A | 8/1993 | Sheth et al. | |
| 5,335,343 A | 8/1994 | Lampson et al. | |
| 5,701,480 A | 12/1997 | Raz | |
| 6,513,100 B1 * | 1/2003 | Clift | 711/154 |
| 6,754,737 B2 | 6/2004 | Heynemann et al. | |
| 6,785,779 B2 | 8/2004 | Berg et al. | |
| 7,089,253 B2 | 8/2006 | Hinshaw et al. | |
| 7,236,974 B2 | 6/2007 | Bhattacharjee et al. | |
| 2003/0115276 A1 | 6/2003 | Flaherty et al. | |
| 2004/0015642 A1 | 1/2004 | Moir et al. | |
| 2004/0103123 A1 * | 5/2004 | Bradshaw | 707/202 |
| 2004/0215880 A1 | 10/2004 | Chilimbi et al. | |
| 2006/0085489 A1 | 4/2006 | Tomic et al. | |
| 2006/0112248 A1 | 5/2006 | Meiri et al. | |
| 2006/0190504 A1 | 8/2006 | Pruet | |
| 2006/0218206 A1 | 9/2006 | Bourbonnais et al. | |
| 2006/0218561 A1 * | 9/2006 | Moir et al. | 719/316 |
| 2007/0198781 A1 * | 8/2007 | Dice et al. | 711/145 |
| 2007/0239943 A1 * | 10/2007 | Dice et al. | 711/147 |

OTHER PUBLICATIONS

Costich Oliver, "Transaction Processing Using an Untrusted Scheduler in a Multilevel Database with Replicated Architecture", pp. 1-17.

Dekeyser, et al., "Conflict Scheduling of Transactions on XML Documents", Date: 2004, vol. 27, http://portal.acm.org/citation.cfm?id=1012305.

Yeo, et al., "Linear Orderability of Transactions in Mobile Environment with Heterogeneous Databases", pp. 1-30.

(Continued)

*Primary Examiner* — Yaima Campos

(57) ABSTRACT

Various technologies and techniques are disclosed for providing type stability techniques to enhance contention management. A reference counting mechanism is provided that enables transactions to safely examine states of other transactions. Contention management is facilitated using the reference counting mechanism. When a conflict is detected between two transactions, owning transaction information is obtained. A reference count of the owning transaction is incremented. The system ensures that the correct transaction was incremented. If the owning transaction is still a conflicting transaction, then a contention management decision is made to determine proper resolution. When the decision is made, the reference count on the owning transaction is decremented by the conflicting transaction. When each transaction completes, the reference counts it holds to itself is decremented. Data structures cannot be deallocated until their reference count is zero. Dedicated type-stable allocation pools can be reduced using an unstable attribute.

15 Claims, 10 Drawing Sheets

OTHER PUBLICATIONS

PCT International Search Report for International Application No. PCT/US2008/067346 mailed Jan. 19, 2009 (7 pages).

PCT Written Opinion for International Application No. PCT/US2008/067346 mailed Jan. 19, 2009 (4 pages).

* cited by examiner

US 7,991,967 B2

USING TYPE STABILITY TO FACILITATE CONTENTION MANAGEMENT

BACKGROUND

Transactional memory is a mechanism that allows concurrent programs to be written more simply. A transaction specifies a sequence of code that is supposed to execute "as if" it were executing in isolation. In practice, transactions are allowed to execute concurrency, and conflicting data accesses are then detected. Decisions on what to do when contention occurs, i.e., "contention management," can have large effects on the performance of transaction systems.

There is an important underlying problem in implementing a contention manager, however. Suppose that transaction Tx1 detects contention with transaction Tx2—perhaps Tx2 holds a pessimistic write lock on a data item that Tx1 also wishes to lock. In some situations, it might make sense for a contention manager to abort Tx2, allowing Tx1 to acquire the lock. Perhaps Tx2 is short, and Tx1 is long, so the cost of redoing Tx2's work after abort would be much less than redoing Tx1's.

But in this example scenario, Tx1 noticed the contention, and thus seems like the logical place to execute the logic of the contention management decision. But to do so, it needs information about Tx2, such as statistics about its execution, the contents of its transaction log, or perhaps to request that Tx2 voluntarily aborts, freeing up its acquired locks. This information most naturally resides in the data structure representing the transaction Tx2. For efficiency reasons, it is desirable to have this data structure be local to the thread executing Tx2, rather than in some global data structure. The transactional memory system will define some locking data structure covering each possibly-shared data item. When a location is write-locked, this locking data structure will contain some indication of the transaction that holds the lock. When Tx1 discovers that the data item it seeks to access is write-locked, it can read this locking data structure to discover the identity of the Tx2. The crux of the problem is that once Tx1 had obtained a pointer to the data structure representing Tx2, and prepares to read information from that data structure, Tx2 may complete, and its data structure may be deallocated, and perhaps reallocated for some other purpose. In this situation, the information Tx1 reads about Tx2 is not stable.

SUMMARY

Various technologies and techniques are disclosed for providing type stability techniques to enhance contention management. A transactional memory system provides a reference counting mechanism that enables transactions to safely examine data structures representing other transactions. The resolution of conflicts between two transactions (called "contention management") is facilitated using the reference counting mechanism. For example, because one transaction attempts to acquire an exclusive lock that another transaction owns, information about the owning transaction is obtained. A reference count of the data structure representing the owning transaction is incremented. The system ensures that the correct transaction data structure reference count was incremented, preventing that data structure from being deallocated and re-allocated to represent another transaction. If the owning transaction still holds the lock that caused the conflict, then information in the owning transaction data structure informs a contention management decision that determines whether to abort one of the two transactions or to wait for the owning transaction to release the lock.

When the contention management decision is made, the reference count of the owning transaction data structure is decremented by the conflicting transaction that previously incremented it. Each transaction data structure starts with a reference count of one, and, as each transaction completes, it decrements the reference count of its data structure. A non-zero reference count prevents the deallocation of a transaction data structure while a conflicting transaction in another thread is accessing the data structure. Data structures can be deallocated when their reference count is zero.

In one implementation, dedicated type-stable allocation pools can be reduced using an unstable attribute. A thread unstable attribute is set before pointers to the transaction data structures can be acquired by threads, and cleared after uses of such pointers are complete. During a garbage collection pause, objects in a type-stable allocation pool can only be deleted if the thread unstable attribute is not set on any of the threads.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a transactional memory system, but the technologies and techniques also serve other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a transactional memory system is provided that uses type stability techniques to enable lock-free contention management. In one implementation, a reference counting mechanism is provided that allows one transaction to safely examine the data structure representing another transaction. The term "reference counting mechanism" as used herein is meant to include a technique for tracking a number or other data for a given transaction data structure that indicates if other transactions have an interest in the given data structure at a particular moment and for keeping the given transaction data structure from being deallocated (returned to the type-stable allocation pool) while other transactions have an interest. The term "type-stable allocation pool" as used herein denotes a pool of memory from which objects are allocated in a special way: once a block is allocated to represent an object of type T, that memory is never re-used to represent some other type U. Thus, a pointer to such a T may always be assumed to point to a T. The term "safely examine" as used herein is meant to include the ability to examine the data in a way that does not allow the data being examined to be deallocated while the examination is in process. A reference count of a transaction data structure is incremented by each other transaction that registers an interest in it. The reference count is decremented when this interest ends. Each transaction, of course, has "an interest" in the data structure that represents it, so these are allocated with reference count one, and when a transaction completes, the reference counts of its transaction data structure is decremented. Data structures cannot be deallocated until their reference count is zero. In another implementation, dedicated type-stable allocation pools can be freed safely through the use of an unstable attribute recognized by the garbage collector. A thread unstable attribute is set before pointers to the transaction data structures can be acquired by threads, and reset after all uses of these pointers have been completed. During a garbage collection pause, objects in a type-stable allocation pool can only be deleted if the thread unstable attribute is not set on any of the threads.

Figure 1:
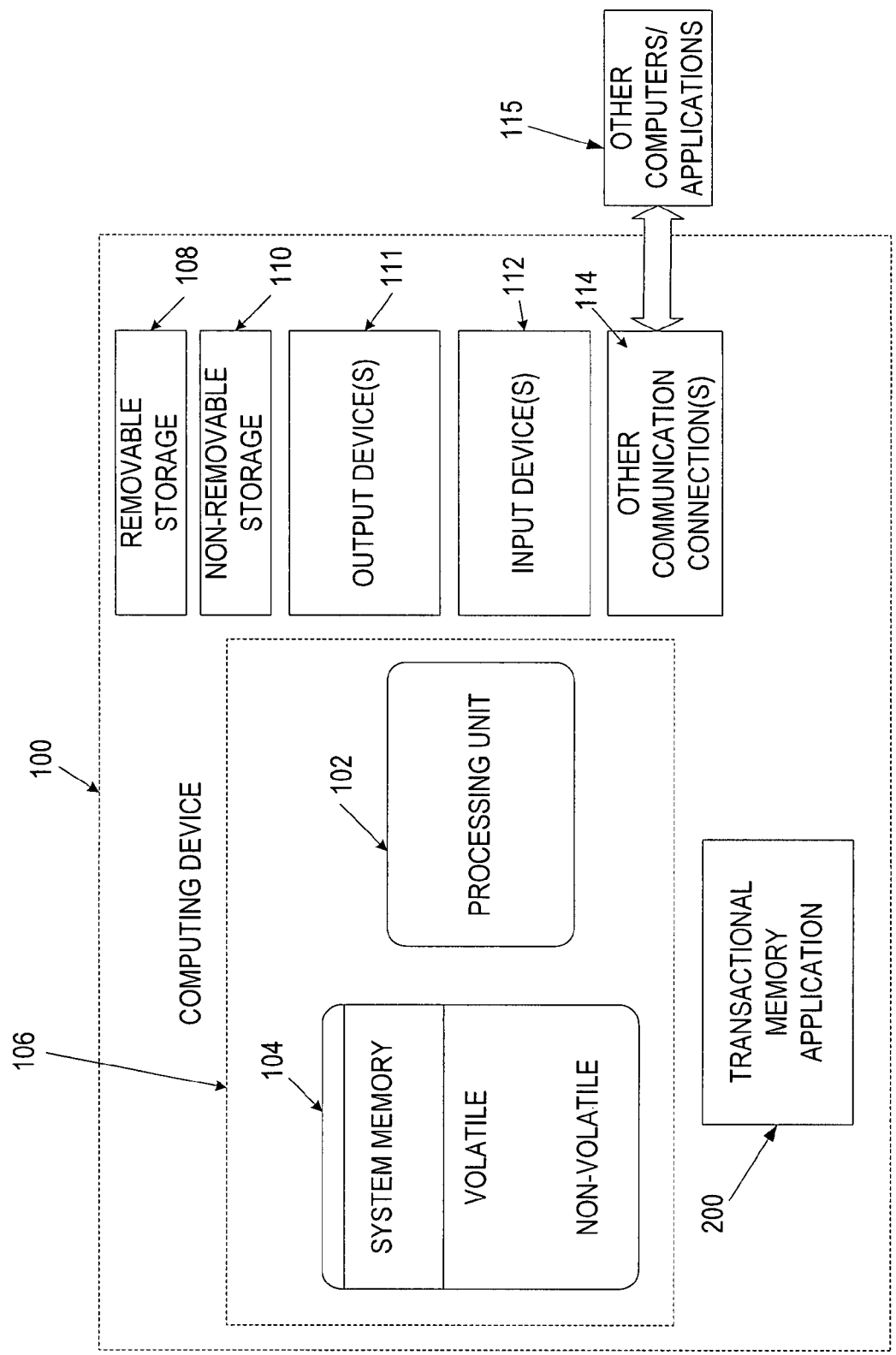
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
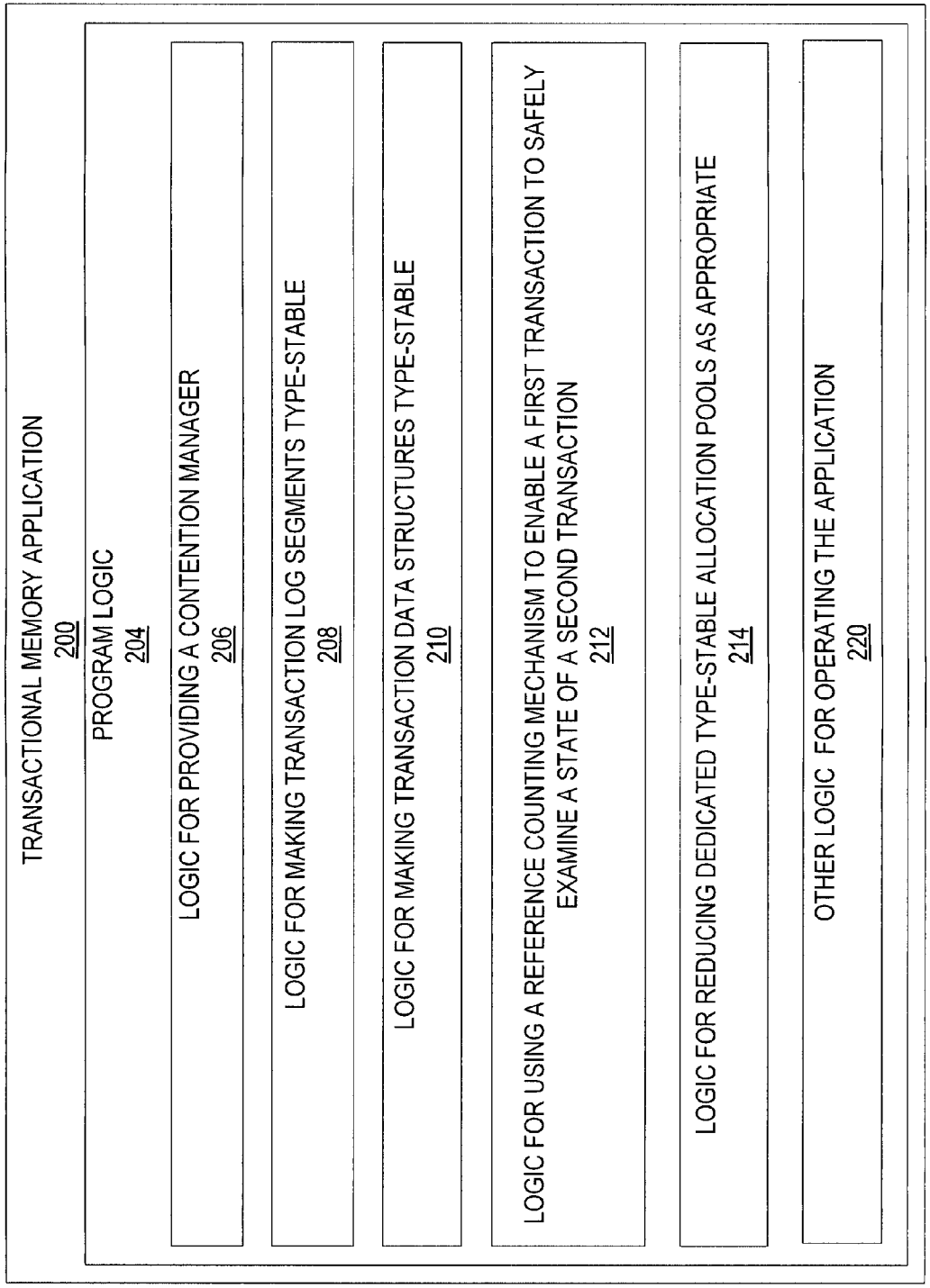
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a contention manager 206; logic for making transaction log segments type-stable 208 (as described below with respect to FIG. 4); logic for making transaction data structures type-stable 210 (as described below with respect to FIG. 5); logic for using a reference counting mechanism to enable a first transaction to safely examine a state of a second transaction 212 (as described below with respect to FIGS. 6-8); logic for reducing dedicated type-stable allocation pools as appropriate 214 (as described below with respect to FIGS. 9-10); and other logic for operating the application 220.

Figure 3:
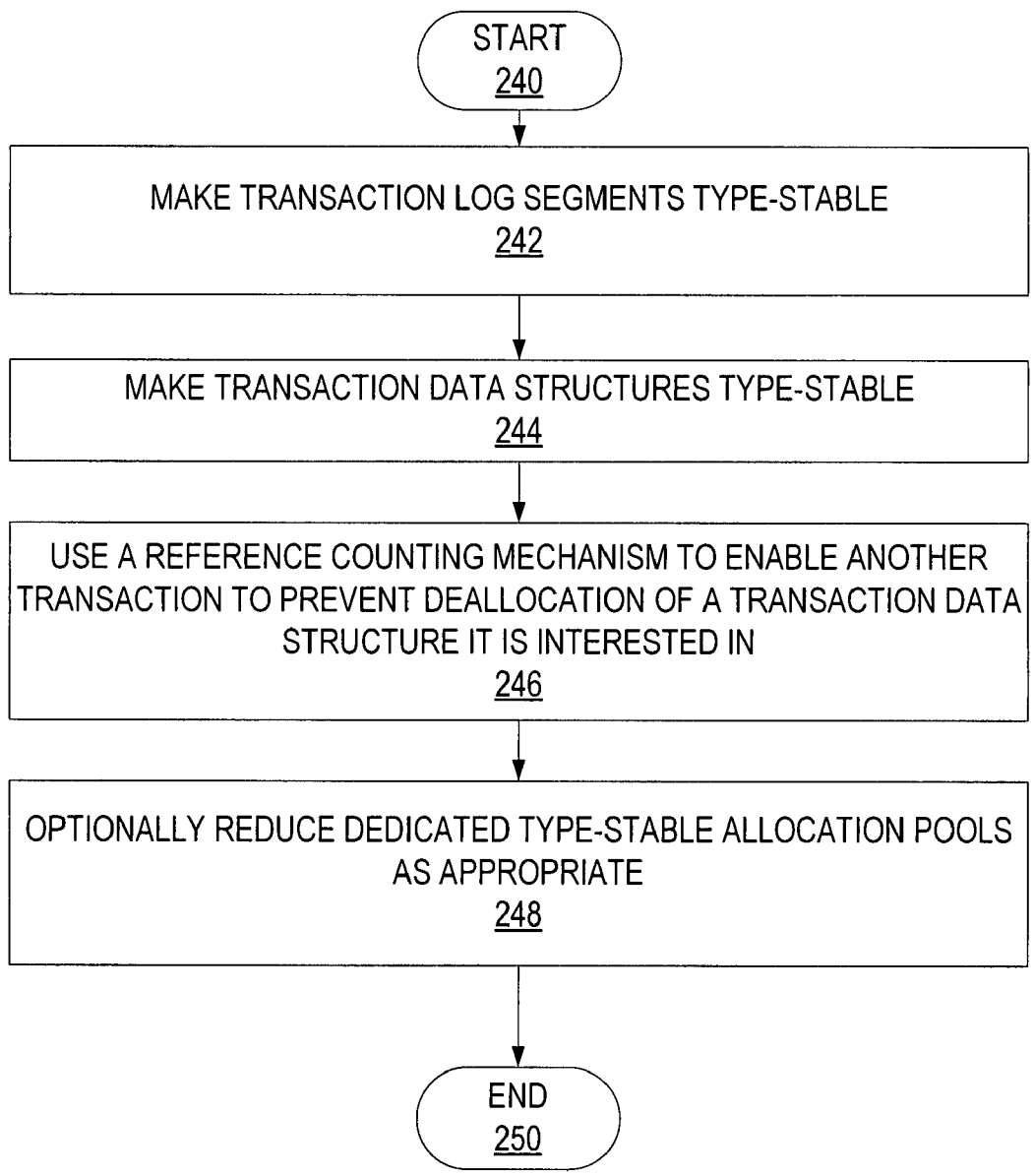
FIG. 3 is a high-level process flow diagram for one implementation of the system of FIG. 1.

Turning now to FIGS. 3-10 with continued reference to FIGS. 1-2, the stages for implementing one or more implementations of transactional memory application 200 are described in further detail. In some implementations, the processes of FIGS. 3-10 are at least partially implemented in the operating logic of computing device 100. FIG. 3 is a high level process flow diagram for transactional memory application 200. It should be noted that while FIG. 3 is described in an order, there is no order intended, and the features and/or actions described in FIG. 3 could be provided and/or performed in other orders. The process begins at start point 240 with making transaction log segments type-stable, as described in further detail in FIG. 4 (stage 242). Type-stability guarantees that the object pointed by a type-stable pointer is of the indicated type. In a concurrent environment, the contents of the referent object may be changed by concurrent threads, but its type will not change. The system makes transaction data structures type-stable, as described in further detail in FIG. 5 (stage 244). A reference counting mechanism is used to enable another transaction to prevent deallocation of a transaction data structure it is interested in, as described in further detail in FIGS. 6-8 (stage 246). The system optionally reduces dedicated type-stable allocation pools as appropriate, as described in further detail in FIGS. 9 and 10 (stage 248). The process ends at end point 250.

Figure 4:
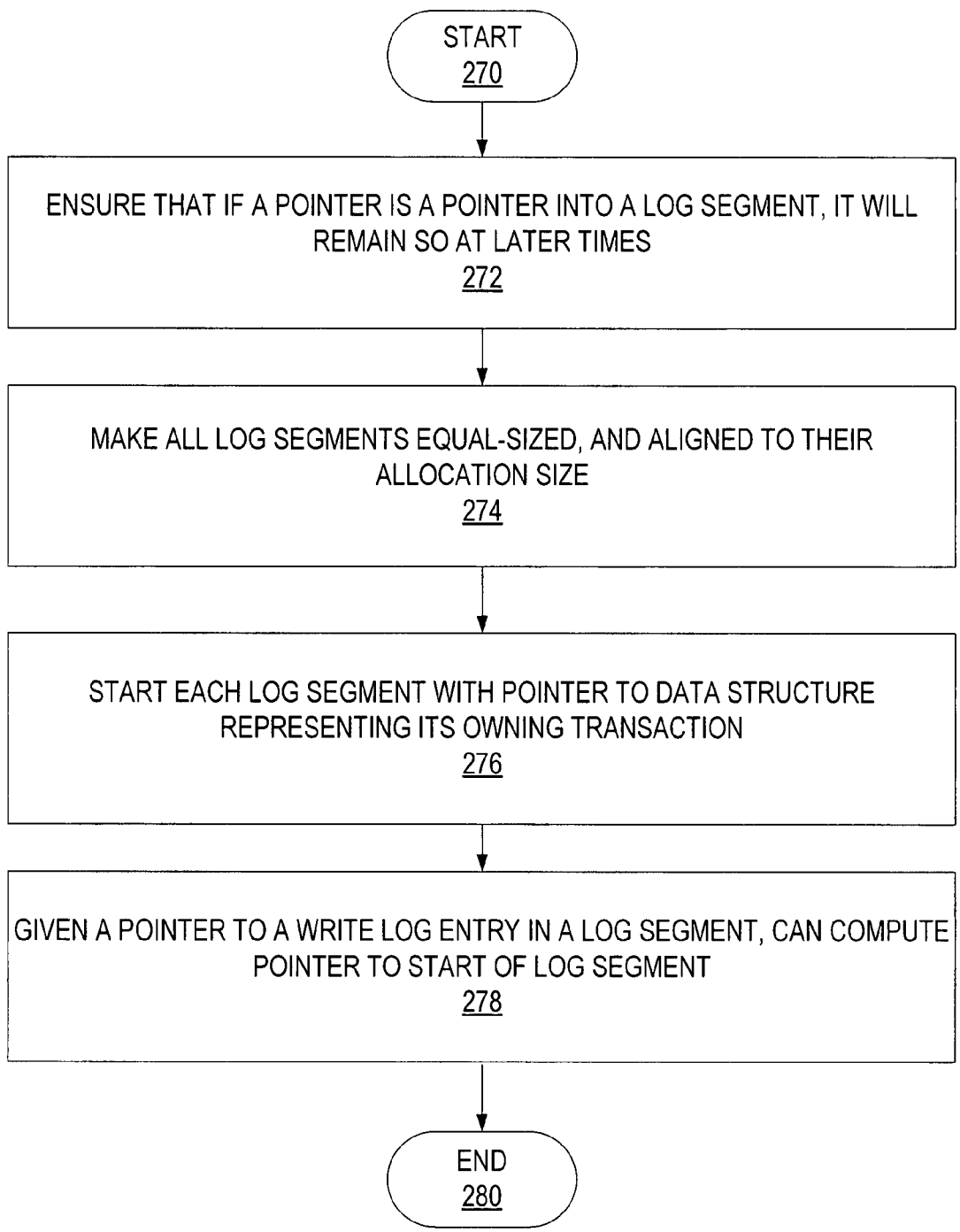
FIG. 4 is a process flow diagram for one implementation of the system of FIG. 1 illustrating the stages involved in making transaction log segments type-stable.

FIG. 4 illustrates one implementation of the stages involved in making transaction log segments type-stable. It should be noted that while FIG. 4 is described in an order, there is no order intended, and the features and/or actions described in FIG. 4 could be provided and/or performed in other orders. The process begins at start point 270 with ensuring that if a pointer is a pointer into a log segment, it will remain so at later times (stage 272). The system makes all log segments equal-sized, and aligned to their allocation size (stage 274). The system starts each log segment with a pointer to the data structure representing its owning transaction (stage 276). Given a pointer to a write log entry in a log segment, a pointer to the start of the log segment can be computed (stage 278). The process ends at end point 280.

Figure 5:
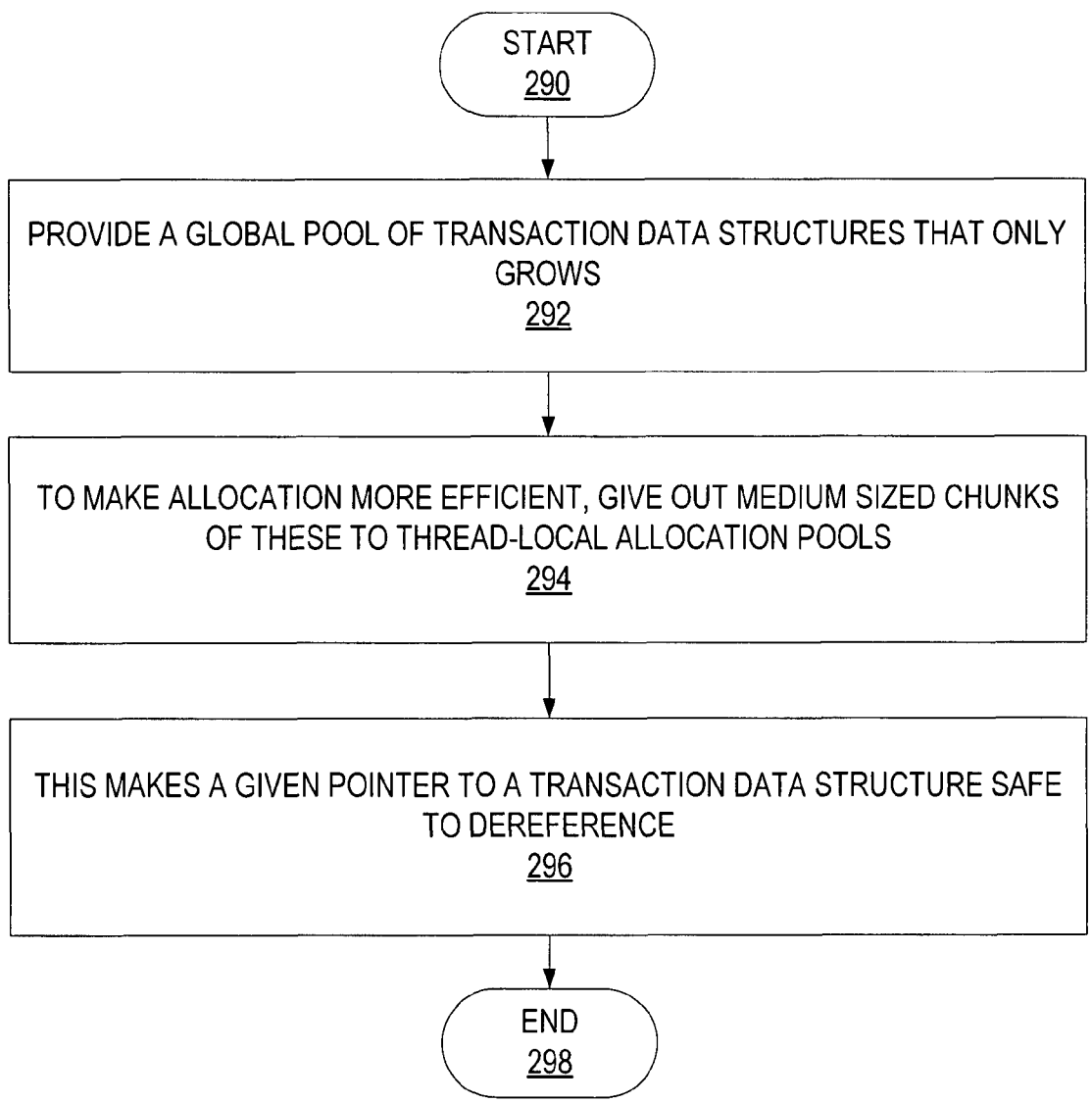
FIG. 5 is a process flow diagram for one implementation of the system of FIG. 1 illustrating the stages involved in making transaction data structures type-stable.

FIG. 5 illustrates one implementation of the stages involved in making transaction data structures type-stable. The process begins at start point 290 with providing a global pool of transaction data structures that only grows (stage 292). To make allocation more efficient, medium sized chunks of them are given out to thread-local allocation pools (stage 294). This makes a given pointer to a transaction data structure safe to dereference (stage 296). The process ends at end point 298.

Figure 6:
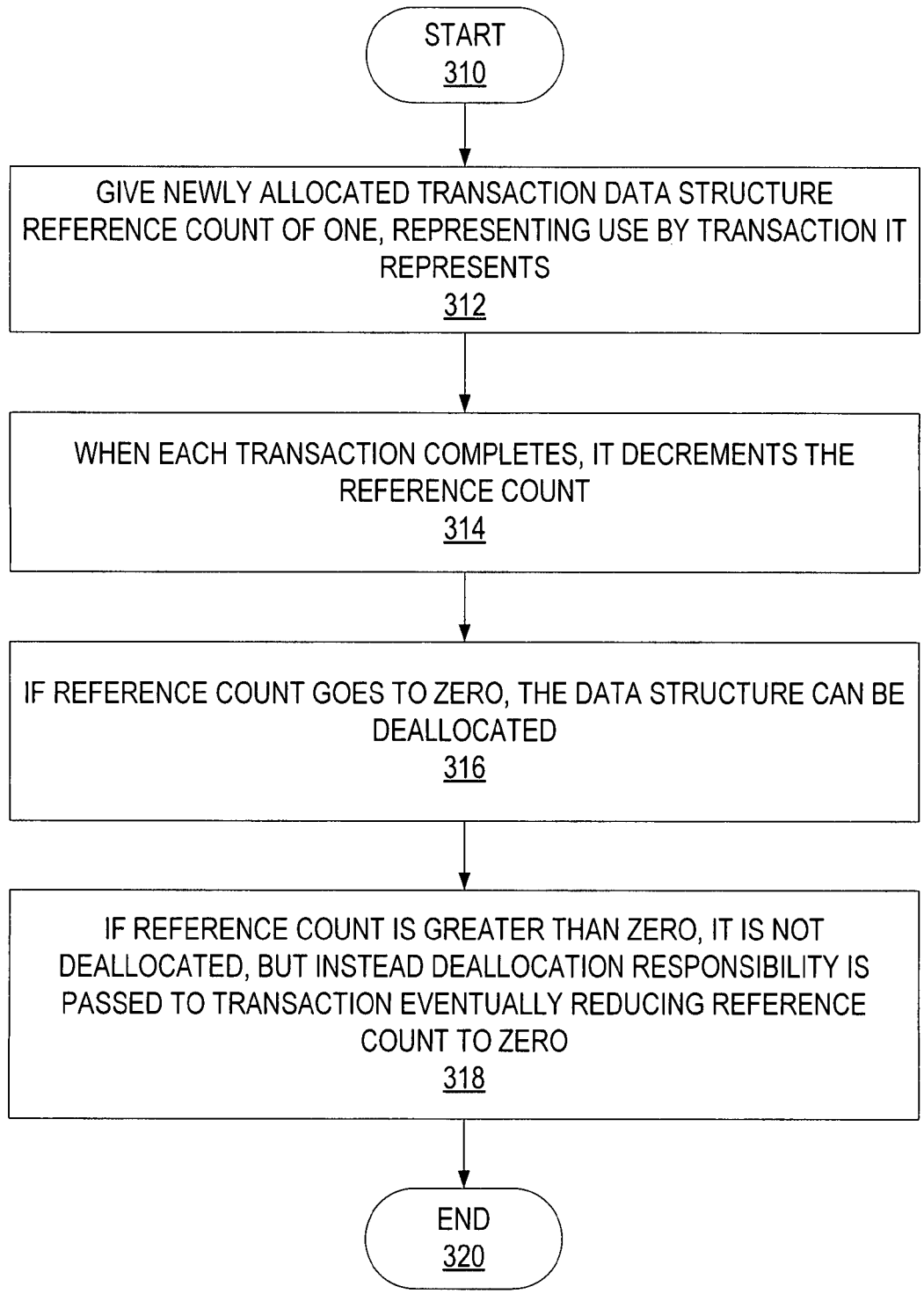
FIG. 6 is a process flow diagram for one implementation of the system of FIG. 1 illustrating the actions taken by a transaction holding the lock that is participating in a reference counting mechanism.

FIG. 6 illustrates one implementation of the actions taken by a transaction holding the lock that is participating in a reference counting mechanism. The process begins at start point 310 with giving a newly allocated transaction data structure a reference count of one, representing use by the transaction it represents (stage 312). When each transaction completes, it decrements the reference count of its own transaction data structure (stage 314). If the reference count goes to zero, the data structure can be deallocated (stage 316). If reference count is greater than zero, it is not deallocated, but instead deallocation responsibility gets passed to the transaction that eventually reduces the reference count to zero (stage 318). The process ends at end point 320.

Figure 7:
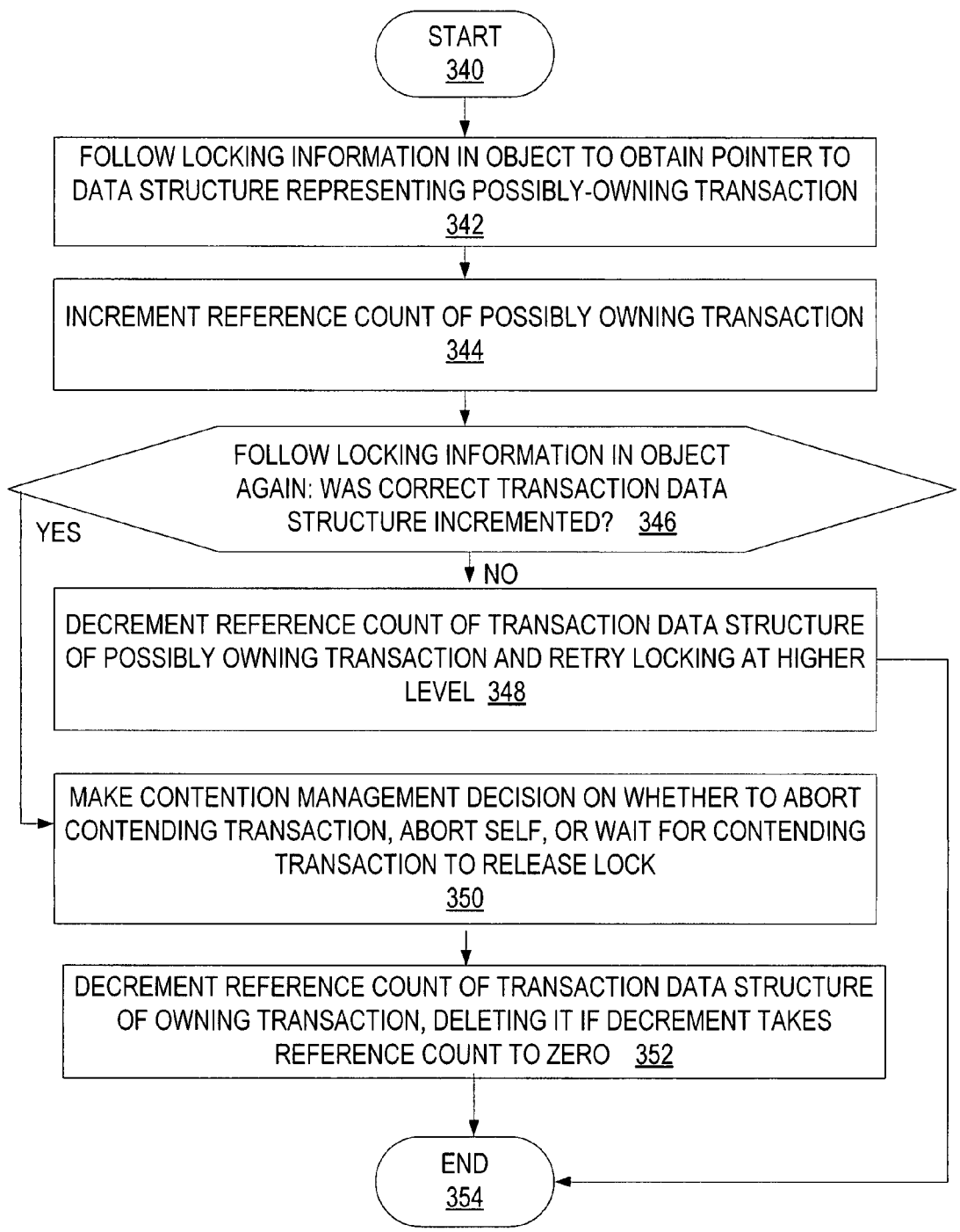
FIG. 7 is a process flow diagram for one implementation of the system of FIG. 1 that illustrates the actions taken by a transaction participating in a reference counting mechanism that notices contention.

FIG. 7 illustrates one implementation of the actions taken by a transaction participating in a reference counting mechanism that notices contention. The process begins at start point 340 with following locking information in an object to obtain a pointer to the data structure representing the possibly-owning transaction (stage 342). A reference count is incremented in the data structure of the possibly owning transaction (stage 344). Upon following the locking information in the object again, determine if the reference count of the correct transaction data structure was incremented (decision point 346). The transaction data structure is for the "correct transaction" if the locking information still leads to the same transaction data structure. If the correct reference count was not incremented, then the reference count of the data structure of the possibly owning transaction is decremented and locking is retried at a higher level (stage 348).

If the reference count of the correct transaction data structure was incremented (decision point 346), then a contention management decision is made on whether to abort the contending transaction, to abort self (the transaction that noticed the contention), or whether to wait for the contending transaction to release the lock (stage 350). The reference count of the owning transaction data structure is then decremented, and the data structure is deleted if the decrement takes its reference count to zero (stage 352). The process ends at end point 354.

Figure 8:
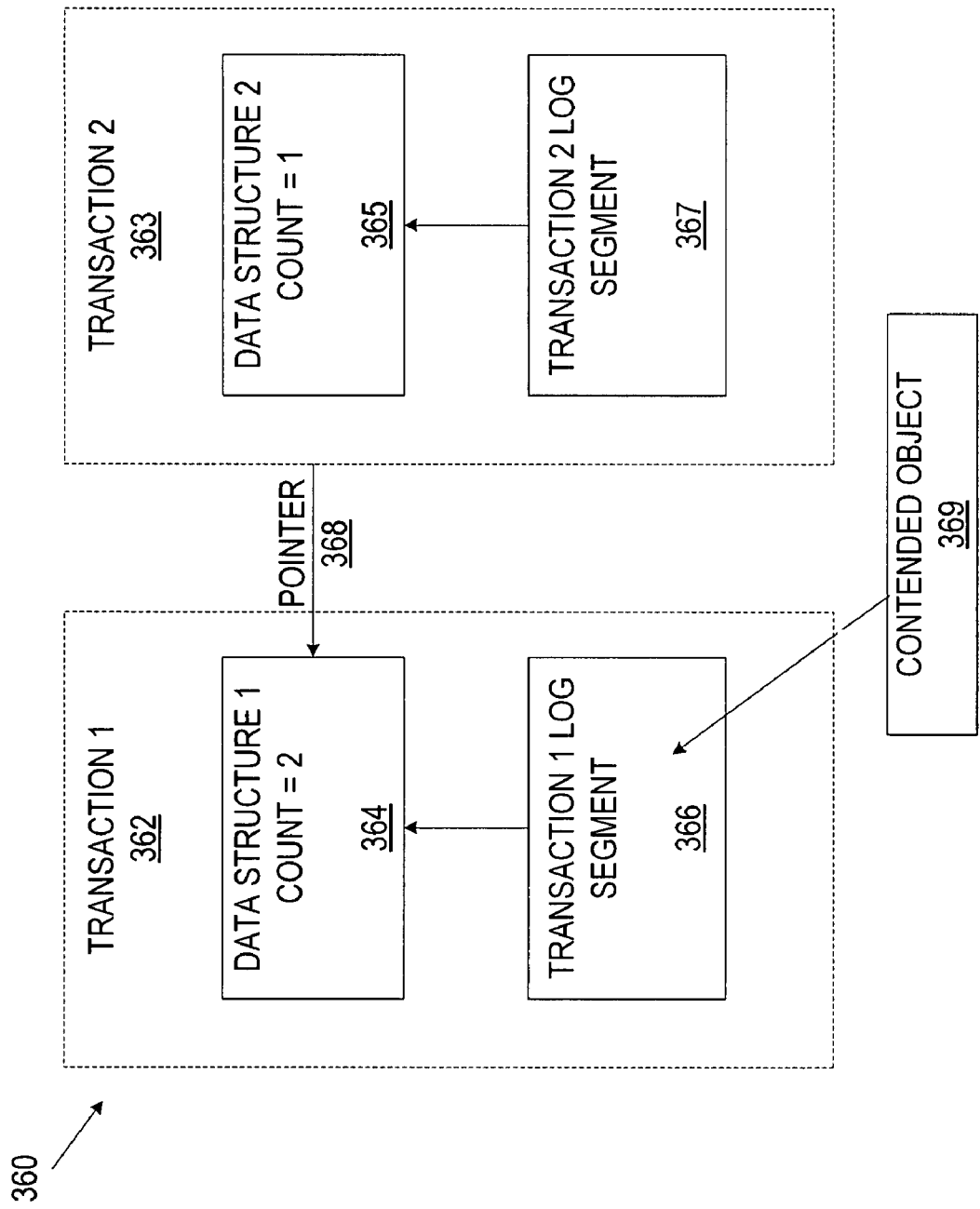
FIG. 8 is a diagrammatic view of one implementation of using a reference counting mechanism between two transactions.

FIG. 8 is a diagrammatic view of one implementation of using a reference counting mechanism between two transactions. The first transaction 362 has a data structure 364 and a transaction log segment 366. The second transaction 363 also has a data structure 365 and a transaction log segment 367. When the second transaction 363 registers an interest in the data structure of the first transaction 362 because of a contended object 369, the second transaction 363 reads locking information in the contended object 369 to discover that the object is locked, and that the first transaction 362 holds the lock. In this implementation, the locking information in contended object 369 contains a pointer to an entry in the log of the locking transaction 362, which contains more information about the locking. As discussed previously, log segments contain pointers to their owning transaction data structure 364. In other implementations, other locking mechanisms can be used to identify the data structure for the transaction that owns the lock. For example, the locking information might indicate the owning transaction directly, and other information about the locking stored in the log entry in log segment 366 might be kept in a hash table indexed by the address of the locked object.

The second transaction increments the reference count (shown with a value of 2, after this increment) in the data structure 364 of the first transaction 362. The thread executing the first transaction is not stopped during this process. It may continue executing, complete its transactional work 362, and deallocate the data structure 364 that represented it. This data structure may even be re-allocated to represent a third transaction. The purpose of incrementing the reference count is to prevent deallocation, but the increment may occur after these steps, so that the data structure is deallocated or represents a different transaction. The second transaction 363 must therefore verify, after incrementing the reference count, that data structure 364 still represents the transaction of interest. It checks the locking information in contended object 364 again, verifying that it still leads to the same transaction data structure 364. If it does not, then the locking information of contended object 369 has changed; we therefore retry the locking process from the beginning, since it may now succeed. If it does lead to the same transaction data structure 364, transaction 363 has obtained a pointer 368 to the data structure 364 of the first transaction 362 so that it can safely examine the data structure 364 to facilitate a contention management decision for the contended object 369. When the second transaction 363 completes, it decrements the reference count of the data structure 364 in the first transaction 362 to indicate that it no longer has an interest in that data structure. A particular transaction data structure cannot be deallocated until its reference count is zero, which means that there are no longer any transactions interested in its data. If transaction 362 has previously completed, then the decrement by transaction 363 may take the reference count of transaction data structure 364 to zero, in which case transaction 363 must deallocate this data structure.

Figure 9:
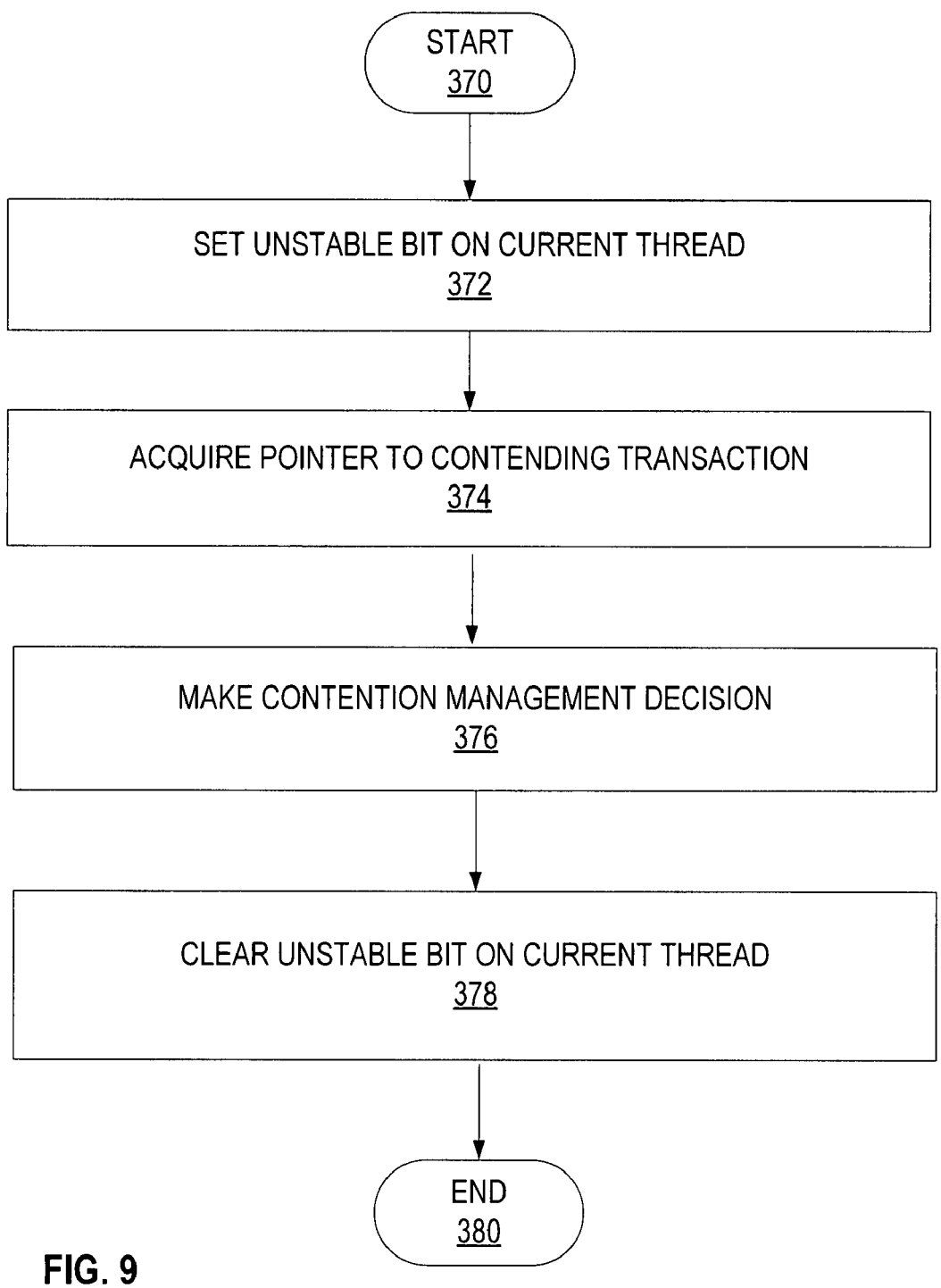
FIG. 9 is a process flow diagram for one implementation of the system of FIG. 1 that illustrates the stages involved in reducing dedicated type-stable allocation pools using an unstable attribute.

FIG. 9 illustrates one implementation of the stages involved in reducing dedicated type-stable allocation pools using an unstable attribute. The process begins at start point 370 with setting an unstable bit on the current thread (stage 372). A pointer is then acquired to a contending transaction (stage 374). In one implementation, each thread must set an unstable attribute before possibly acquiring pointers to transaction data structures. A contention management decision is made to resolve the conflict (stage 376). Once the contention management decision is made, the pointer to the contending transaction is no longer used (stage 376). Thus, the unstable bit is cleared on the current thread (stage 378). In one implementation, if all threads are stopped at garbage collection, and no thread has its unstable attribute set, then objects in the type-stable allocation pools may be deallocated. This deallocation is not type-stable, as the deleted memory may be returned to the operating system and reallocated to represent other types. The process ends at end point 380.

Figure 10:
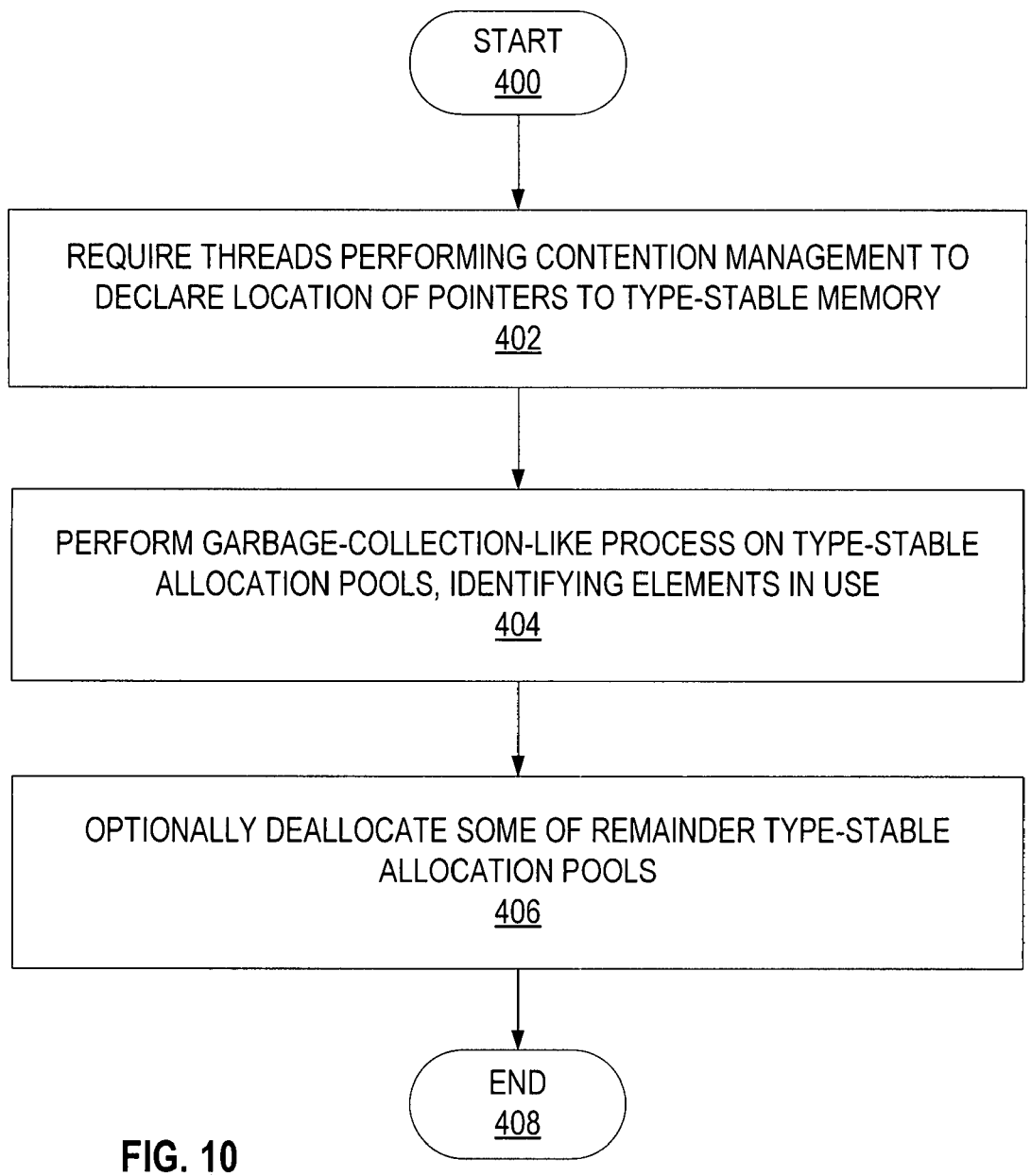
FIG. 10 is a process flow diagram that illustrates an alternate implementation for reducing dedicated type-stable allocation pools by tracking location of pointers to type-stable memory.

FIG. 10 illustrates an alternate to the implementation of FIG. 9 that illustrates the stages involved in reducing dedicated type-stable allocation pools by tracking the location of pointers to type-stable memory. The process begins at start point 400 with requiring threads performing contention management to declare the location of pointers to type-stable memory (stage 402). The system performs a garbage-collection-like process on type-stable allocation pools, identifying the elements that are in use (stage 404). The system optionally deallocates some of the remaining type-stable allocation pools (stage 406). The process ends at end point 408.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable storage medium having computer-executable instructions for causing a computer to perform a method comprising:
    allocating transaction data structures for a plurality of transactions including:
        making the transaction data structures type-stable to guarantee the transaction data structure type will not change but to allow contents of the transaction data structure to be changed by concurrent transactions; and
        making transaction log segments for the plurality of transactions type-stable to guarantee the transaction log segment type will not change; and
    performing a reference counting mechanism that enables a first one of the transactions to safely examine a state of a second one of the transactions.

2. The computer-readable storage medium of claim 1, wherein the first transaction obtains a pointer to a transaction data structure of the second transaction.

3. The computer-readable storage medium of claim 2, wherein a reference count is incremented in the transaction data structure of the second transaction when the first transaction registers an interest in the second transaction.

4. The computer-readable storage medium of claim 3, wherein the reference count is given a value of one when the transaction data structure is first allocated.

5. The computer-readable storage medium of claim 3, wherein the pointer is used to look at the transaction data structure of the second transaction to make a contention management decision.

6. The computer-readable storage medium of claim 5, wherein the reference count in the transaction data structure of the second transaction is decremented after the contention management decision is made.

7. The computer-readable storage medium of claim 6, wherein if the reference count is greater than zero, deallocation responsibility is passed to a particular transaction that eventually will reduce the reference count to zero.

8. The computer-readable storage medium of claim 6, wherein if the reference count goes to zero, the transaction data structure is deallocated.

9. The computer-readable storage medium of claim 1, wherein the reference counting mechanism is operable to enable the first transaction to prevent deallocation of the second transaction while the first transaction has an interest in the second transaction.

10. A method facilitating contention management using a reference counting mechanism comprising:
    allocating a plurality of transaction data structures including making the transaction data structures type-stable to guarantee the transaction data structure type will not change but to allow contents of the transaction data structure to be changed by concurrent transactions;
    when detecting that a conflict has occurred between two transactions, obtaining information about an owning transaction, the owning transaction being one of the two transactions, wherein the detecting and obtaining is performed by a second of the two transactions;
    incrementing a reference count in a particular transaction data structure that is associated with the owning transaction;
    ensuring a correct transaction was incremented; and
    making a contention management decision on how to handle the conflict which includes deciding whether to abort the owning transaction, abort the second transaction, or wait for the owning transaction.

11. The method of claim 10, wherein if the ensuring is not successful, retrying locking at a higher level since the conflict has gone away.

12. The method of claim 10, wherein if the correct transaction was not incremented, decrementing the reference count.

13. The method of claim 12, wherein a determination on whether the correct transaction was incremented is made by following locking information in an object to obtain the owning transaction information.

14. The method of claim 10, wherein the owning transaction information is obtained by following locking information associated with an object.

15. A computer-readable storage medium having computer-executable instructions for causing a computer to perform the steps recited in claim 10.

* * * * *